US009576065B2

(12) United States Patent
Mukherjee et al.

(10) Patent No.: US 9,576,065 B2
(45) Date of Patent: Feb. 21, 2017

(54) METHOD FOR MAINTAINING COMMON DATA ACROSS MULTIPLE PLATFORMS

(71) Applicant: Go Daddy Operating Company, LLC, Scottsdale, AZ (US)

(72) Inventors: Rajatish Mukherjee, Sunnyvale, CA (US); Raj Nijjer, Phoenix, AZ (US); Justin Tsai, San Francisco, CA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 379 days.

(21) Appl. No.: 13/944,789

(22) Filed: Jul. 17, 2013

(65) Prior Publication Data

US 2015/0026201 A1    Jan. 22, 2015

(51) Int. Cl.
*G06F 17/30*    (2006.01)
*G06F 7/00*    (2006.01)

(52) U.S. Cl.
CPC .............................. *G06F 17/30893* (2013.01)

(58) Field of Classification Search
USPC ........................................................ 707/756
See application file for complete search history.

(56) References Cited

U.S. PATENT DOCUMENTS

| | | |
|---|---|---|
| 5,796,393 A | 8/1998 | MacNaughton et al. |
| 5,944,790 A | 8/1999 | Levy |
| 6,484,149 B1 | 11/2002 | Jammes et al. |
| 6,601,057 B1 | 7/2003 | Underwood et al. |
| 6,745,196 B1 | 6/2004 | Colyer et al. |
| 6,834,306 B1 | 12/2004 | Tsimelzon |
| 6,938,205 B1 | 8/2005 | Hanson et al. |
| 7,047,202 B2 | 5/2006 | Jaipuria et al. |
| 7,062,492 B1 | 6/2006 | Graham |
| 7,117,254 B2 | 10/2006 | Lunt et al. |

(Continued)

FOREIGN PATENT DOCUMENTS

WO    2007052285    5/2007

OTHER PUBLICATIONS

Internet print-out of http://web.archive.org/web/20000901042248/http://www.datex.net/ecommerce/glossary.htm, Internet archive of datex.net, Sep. 1, 2000.

(Continued)

*Primary Examiner* — Kuen Lu
(74) *Attorney, Agent, or Firm* — Quarles & Brady LLP

(57) ABSTRACT

Systems and methods are described for maintaining a user's common data across multiple platforms. The common data is information about the user and graphical and design elements of publications that should be consistently presented across online, other electronic, and non-electronic platforms, such as websites, social networking profiles, electronic and printed business listings, email and print newsletters, business cards, letterhead, and the like. The common data may be stored and updated by a centralized or distributed system including one or more servers communicating with the platforms and with a content database that retains the common data in a stored data structure. The system may provide an interface to the user, receive common data elements input by the user, add the common data elements to the stored data structure, and distribute the common data elements to the platforms. The system may identify which platforms require which elements of the common data.

15 Claims, 8 Drawing Sheets

(56) References Cited

U.S. PATENT DOCUMENTS

| | | | |
|---|---|---|---|
| 7,191,210 B2 | 3/2007 | Grossman | |
| 7,246,305 B2 | 7/2007 | Batres | |
| 7,337,172 B2 | 2/2008 | Shapiro | |
| 7,467,140 B2 * | 12/2008 | Monroe | |
| 7,483,875 B2 * | 1/2009 | McKay | |
| 7,500,182 B2 | 3/2009 | Kelly | |
| 7,500,183 B2 | 3/2009 | Kelly | |
| 7,596,620 B1 | 9/2009 | Colton et al. | |
| 7,698,425 B2 | 4/2010 | Thayer et al. | |
| 7,698,426 B2 | 4/2010 | Thayer et al. | |
| 7,743,334 B2 | 6/2010 | Rider | |
| 7,747,746 B2 | 6/2010 | Thayer et al. | |
| 7,752,251 B1 | 7/2010 | Shuster et al. | |
| 7,840,690 B2 | 11/2010 | Thayer et al. | |
| 7,983,924 B2 | 7/2011 | Garrison | |
| 7,991,764 B2 | 8/2011 | Rathod | |
| 8,005,970 B2 | 8/2011 | Thayer et al. | |
| 8,276,057 B2 | 9/2012 | Rowe et al. | |
| 8,312,364 B2 | 11/2012 | Rowe et al. | |
| 8,355,527 B2 | 1/2013 | Bladel et al. | |
| 8,356,090 B2 | 1/2013 | Parsons et al. | |
| 2001/0034646 A1 | 10/2001 | Hoyt et al. | |
| 2002/0023132 A1 | 2/2002 | Tornabene et al. | |
| 2002/0131565 A1 | 9/2002 | Scheuring et al. | |
| 2002/0143659 A1 | 10/2002 | Keezer et al. | |
| 2002/0169852 A1 | 11/2002 | Schaeck | |
| 2003/0055652 A1 | 3/2003 | Nichols et al. | |
| 2004/0168066 A1 | 8/2004 | Alden | |
| 2004/0205200 A1 | 10/2004 | Kothari et al. | |
| 2004/0225569 A1 | 11/2004 | Bunnell | |
| 2005/0038869 A1 | 2/2005 | Zimler et al. | |
| 2005/0060263 A1 | 3/2005 | Golan et al. | |
| 2005/0097180 A1 | 5/2005 | Abdelhak | |
| 2005/0159998 A1 | 7/2005 | Buyukkokten et al. | |
| 2005/0198201 A1 | 9/2005 | Bohn et al. | |
| 2005/0216300 A1 | 9/2005 | Appelman et al. | |
| 2005/0246627 A1 | 11/2005 | Sayed | |
| 2005/0267940 A1 | 12/2005 | Galbreath et al. | |
| 2006/0104526 A1 | 5/2006 | Gringeler et al. | |
| 2006/0259320 A1 | 11/2006 | LaSalle et al. | |
| 2007/0022366 A1 | 1/2007 | Novitchenko | |
| 2007/0083560 A1 | 4/2007 | Choi et al. | |
| 2007/0088713 A1 | 4/2007 | Baxter et al. | |
| 2007/0162458 A1 | 7/2007 | Fasciano | |
| 2007/0179863 A1 | 8/2007 | Stoll | |
| 2007/0214097 A1 | 9/2007 | Parsons et al. | |
| 2007/0220090 A1 | 9/2007 | Hall | |
| 2007/0266034 A1 | 11/2007 | Pousti et al. | |
| 2008/0034040 A1 | 2/2008 | Wherry et al. | |
| 2008/0034060 A1 | 2/2008 | Fisher | |
| 2008/0040733 A1 | 2/2008 | Pousti et al. | |
| 2008/0059348 A1 | 3/2008 | Glassman et al. | |
| 2008/0114867 A1 | 5/2008 | Thayer et al. | |
| 2008/0126170 A1 | 5/2008 | Leck et al. | |
| 2008/0133735 A1 | 6/2008 | Thayer et al. | |
| 2008/0147659 A1 | 6/2008 | Chen | |
| 2008/0154948 A1 | 6/2008 | Stegmann et al. | |
| 2008/0168175 A1 | 7/2008 | Tran | |
| 2008/0228598 A1 | 9/2008 | Leff et al. | |
| 2008/0250312 A1 | 10/2008 | Curtis | |
| 2008/0288582 A1 | 11/2008 | Pousti et al. | |
| 2009/0048904 A1 | 2/2009 | Newton et al. | |
| 2009/0094379 A1 | 4/2009 | Lu et al. | |
| 2009/0119143 A1 | 5/2009 | Silver et al. | |
| 2009/0132487 A1 | 5/2009 | Lev | |
| 2009/0157668 A1 | 6/2009 | Newton et al. | |
| 2009/0182589 A1 | 7/2009 | Kendall et al. | |
| 2009/0216577 A1 | 8/2009 | Killebrew | |
| 2009/0222416 A1 | 9/2009 | Tymoshenko et al. | |
| 2009/0265233 A1 | 10/2009 | Sendo et al. | |
| 2009/0265774 A1 | 10/2009 | Malik et al. | |
| 2009/0281851 A1 | 11/2009 | Newton et al. | |
| 2009/0282144 A1 | 11/2009 | Sherrets et al. | |
| 2009/0319518 A1 | 12/2009 | Koudas et al. | |
| 2009/0327101 A1 | 12/2009 | Sayed | |
| 2009/0327231 A1 | 12/2009 | Zappa et al. | |
| 2010/0042487 A1 | 2/2010 | Barazani | |
| 2010/0057859 A1 | 3/2010 | Shen et al. | |
| 2010/0121707 A1 | 5/2010 | Goeldi | |
| 2010/0153848 A1 | 6/2010 | Saha | |
| 2010/0169159 A1 | 7/2010 | Rose et al. | |
| 2010/0205541 A1 | 8/2010 | Rapaport et al. | |
| 2010/0250676 A1 | 9/2010 | Ufford et al. | |
| 2010/0312837 A1 | 12/2010 | Bodapati et al. | |
| 2011/0023101 A1 | 1/2011 | Vernal et al. | |
| 2011/0055249 A1 | 3/2011 | Consuegra et al. | |
| 2011/0179176 A1 * | 7/2011 | Ravichandran | G06Q 10/06 709/226 |
| 2011/0320542 A1 | 12/2011 | Bendel et al. | |
| 2012/0023085 A1 | 1/2012 | Bellerive et al. | |
| 2012/0296679 A1 | 11/2012 | Im | |
| 2013/0013454 A1 * | 1/2013 | Sears | 705/26.41 |

OTHER PUBLICATIONS

WiredAlumni, Jun. 1, 2000.
Yahoo! Groups Screenshots of http://groups.yahoo.com retrieved from the Internet Archive Wayback Machine dated Jan. 1, 2006.
Dogster, Oct. 27, 2006.
CollectiveX, date unknown.
www.babycenter.com <http://web.archive.org/web/20041214223807/www.babycenter.com/community/?binky=CON:UPH2:COM> retrieved from Internet Archive Wayback Machine, dated Dec 2004. (pp. 1-2).
Go Daddy Software, Oct. 2, 2002, www.archive.org, at http://web.archive.org/web/20021002232511/www.godaddy.com/gdshop/default.asp?e=com.
Go Daddy Software: WebSite Complete v 5.0, Dec. 10, 2002, www.archive.org, at http://web.archive.org/web/20021210150241/www.godaddy.com/gdshop/websitecomplete.asp?isc=&se=+&from_app=.
Microsoft Computer Dictionary, 5th Edition, 2002, p. 383.
Lowensohn, Domain Pigeon now finds open Twitter Names, Apr. 9, 2009.
Groups in Social Software: Utilizing Tagging to Integrate Individual Contexts for Social Navigation, Master Thesis submitted to the Program of Digital Media, Universitat Bremen (2006).
Matt Mazur, CNET—Let's see what happens (Domain Pigeon), Apr. 9, 2009.

* cited by examiner

METHOD FOR MAINTAINING COMMON DATA ACROSS MULTIPLE PLATFORMS

CROSS-REFERENCE TO RELATED APPLICATIONS

This application is related to U.S. patent application Ser. No. 13/944,790, filed on Jul. 17, 2013, and entitled "SYSTEM FOR MAINTAINING COMMON DATA ACROSS MULTIPLE PLATFORMS."

FIELD OF THE INVENTION

The present invention generally relates to data storage and optimization, and, more specifically, to systems and methods for efficiently and effectively propagating changes to information in a database across multiple media platforms.

BACKGROUND OF THE INVENTION

The Internet comprises a vast number of computers and computer networks that are interconnected through communication links. The interconnected computers exchange information using various services. In particular, a server computer system, referred to herein as a web server, may connect through the Internet to a remote client computer system and may send, to the remote client computer system upon request, one or more websites containing one or more graphical and textual web pages of information. A request is made to the web server by visiting the website's address, known as a Uniform Resource Locator ("URL"). Upon receipt, the requesting device can display the web pages. The request and display of the websites are typically conducted using a browser. A browser is a special-purpose application program that effects the requesting of web pages and the displaying of web pages.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A URL is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. Otherwise, the Internet user may keep selecting alternative domain names until an available domain name is found. Domain names are typically registered for a period of one to ten years with first rights to continually re-register the domain name.

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, images, shapes, hyperlinks to other web pages, programming objects such as JAVA applets, form fields, tables, and other elements. The web page can be formatted for proper display on computer systems with widely varying display parameters, due to differences in screen size, resolution, processing power, and maximum download speeds.

Websites can be generated from structured data stored in a database or other data store. In a basic implementation, the data can include multiple records having a data type and content, and a web programming interface can access the database, retrieve records having the desired data types, and add the content of those records to one or more web pages. Additionally, data formats and schema exist that optimize the structured data for inclusion on a website. For example, the Microdata format is a set of HTML tags used to delineate types of data on a web page. Microdata tags can be used in conjunction with a defined data type vocabulary, such as that provided by schema.org, to retain information relating to the data type of data extracted from the database and placed on the website. Retaining such information allows Internet search engines to better understand the content of a website.

The Internet continues to be increasingly valuable to individuals and businesses alike. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other. It is advantageous for individuals and businesses to maintain an online presence, which may include presenting information about the individual or business on multiple online platforms. For example, a business might have its own website at www.thebusiness.com, business listings on GOOGLE Places for Business and BING Places for Business, a profile page on FACEBOOK, one or more blast email lists and a mobile application ("app") that customers download to their mobile device. These platforms can have different virtual locations (i.e. different domains) and partially or fully incompatible formats, despite sharing common information.

Information that is typically common across platforms normally includes the most important information. For individuals, this might be name, photo, phone number, TWITTER handle, blog or personal web page address, and the like. For businesses, this might be name, address, phone number, hours of operation, news feed, product information such as menus or inventory, and the like. Whether such information changes frequently or only on rare occasion, it is very important to the individual or business that the information is consistently presented across all of its online platforms. Unfortunately, the incompatibilities between platforms can require the individual or business to either manually update the information multiple times, or engage a web design firm to maintain the information at some expense and with some risk of errors or omissions as the information is repeatedly updated.

Relatedly, an individual or business may wish to maintain a consistent visual presentation, referred to herein as a theme, across its platforms. Platform incompatibility may prevent or limit the consistency of the theme. For example, color schemes, graphic elements, and layouts are all completely customizable for a standalone website, but FACEBOOK imposes a strict profile format where graphics and layout cannot be easily carried over. It would be advantageous to identify the elements of a theme that can be adapted for use on each platform, in order to best provide the desired consistent presentation. Further, changes to the theme could be more easily propagated across platforms.

Despite the increasing use of the Internet and other online or electronic platforms, individuals and businesses still have physical presences and use printed collateral to convey some of the information from their web presence. Again, the information conveyed on printed collateral, such as flyers, brochures, catalogs, business cards, newsletters, and the like, can include name, contact information, and other information that must be kept consistent. Additionally, printed collateral frequently determines or shares the theme or themes used online. Printed collateral can be designed electronically, using graphic design software such as ADOBE PHOTOSHOP, publishing software such as PAGEPLUS, and other software. These programs can store the information and graphics to be printed in design files that can be accessed by other programs or interfaces.

DETAILED DESCRIPTION OF THE PREFERRED EMBODIMENT

Figure 1:
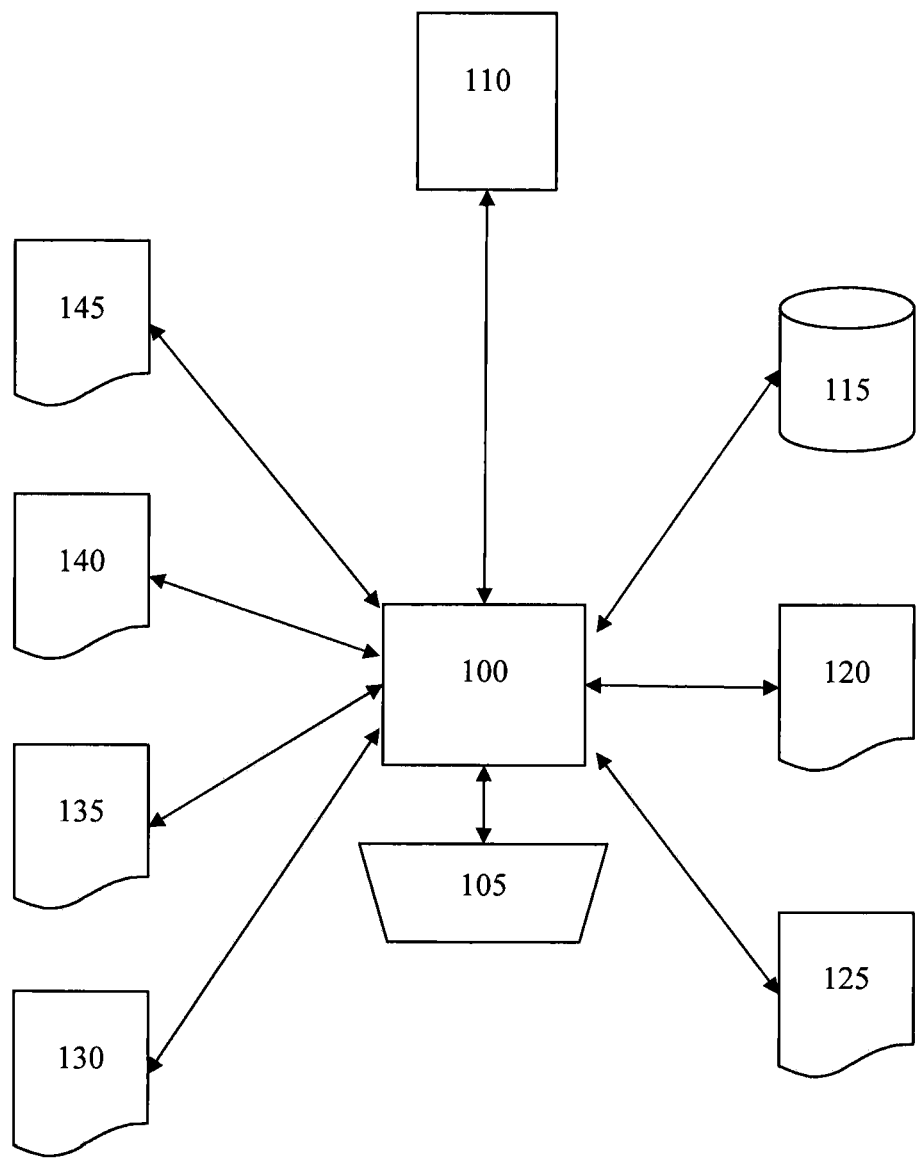
FIG. 1 is schematic diagram of a system and associated operating environment in accordance with the present disclosure.

The present invention overcomes the aforementioned drawbacks by providing a system and method for the maintenance of a user's common data across multiple media platforms by storing the common data as structured data in a database, formatting the common data according to one or more display formats required by each of the platforms, and transmitting the formatted common data either to the platform, to the user, or to an end-user, depending on the requirements of the platform. At least one of the platforms may be a website hosting service that provides the user's website to the public. The web server tasked with serving the website to requesting devices, also known as a hosting provider, may perform one or more algorithms for the data maintenance. Alternatively, the web server may assign the maintenance to a related computer system, such as another web server, collection of web or other servers, a dedicated data processing computer, or another computer capable of performing the maintenance algorithms. Alternatively, a standalone program may be delivered to and installed on a personal computing device, such as the user's desktop computer or mobile device, and the standalone program may be configured to cause the personal computing device to perform the maintenance algorithms. For clarity of explanation, and not to limit the implementation of the present methods, the methods are described below as being performed by a web server that serves the website to requesting devices. The creation of web pages, documents, and printed collateral is described with a left-sided prioritization for left-to-right reading countries; it will be understood that left and right directions may be reversed for right-to-left reading countries.

Common data, as used herein, may be any information that the user wants to accurately and consistently maintain across a plurality of publically available platforms. That is, the user may desire each element of common data to be the same on every platform. In accordance with the present disclosure, each common data element may be promptly updated on all or a subset of the platforms when the element is added or changed on one platform. A platform, as used herein, is a public or semi-private source of information on which a user may maintain information and allow the information to be presented to the public or to a limited audience. A platform may have one or more defined publishing formats that the web server can emulate, or for which the web server can provide format-ready content, as described further below. Platforms in accordance with this disclosure may include, without limitation: online platforms, such as websites, social network profiles, and content feeds and streams including RSS feeds, blogs and vlogs, YOUTUBE channels and other video streaming services, and the like; downloadable and other offline digital platforms, such as electronic newsletters, blast emails, PDFs and other documents, programs, and the like; non-digital electronic platforms such as radio and television broadcasts; and non-electronic platforms, such as letterhead, flyers, brochures, print advertisements, and the like.

In one implementation, a method in accordance with this disclosure may include receiving, from a user, content information for building a website for the user. The content information may be or include one or more common data elements for a plurality of third-party platforms. The method may further include extracting the common data elements from the content information, identifying the common data elements that map to one or more display elements of each third-party platform, accessing each third-party platform, and transmitting the identified common data elements to the respective third-party platform. The method may further include storing the common data elements in a stored data structure, receiving one or more updated common data elements for the plurality of third-party platforms, and comparing the updated common data elements to one or more of the common data elements in the stored data structure. Then, for any of the updated common data elements that do not match the common data elements to which the updated common data elements are compared, the method may include storing the updated common data element in the stored data structure in place of the common data element, and transmitting the updated common data element to one or more of the plurality of third-party platforms. The method may further include receiving, from the user, authorization to access one or more of the third-party platforms on behalf of the user.

In another implementation, a method in accordance with this disclosure may include receiving one or more data elements comprising common data for a plurality of platforms and comparing the data elements to one or more elements of a stored data structure. If the data elements do not match the elements of the stored data structure to which the data elements are compared, the method may include transmitting the data elements to one or more of the plurality of platforms. The method may further include determining that one or more of the data elements is a new common data element that does not correspond to any element of the stored data structure, and transmitting the new common data elements to one or more of the plurality of platforms. The method may further include providing an interface to a user and allowing the user to enter the one or more data elements on the interface. The interface may be provided on a web server and accessible by the user over the internet, or the interface may be provided on one of the platforms. Receiving the one or more data elements may include prompting the user to enter into the interface information for building a website, receiving the information from the user, extracting the one or more data elements from the information, creating one or more web pages containing the information entered by the user, and storing the one or more web pages as the stored data structure. Prompting the user to enter information for building a website may include retrieving a template for a web page, the template comprising one or more regions formatted to display common data, and prompting the user to enter the information intended to be displayed in each of the regions.

Receiving the one or more data elements may include receiving the one or more data elements from one of the plurality of platforms after the one or more data elements are entered onto the platform. Alternatively, receiving the one or more data elements may include accessing one of the platforms, polling the platform to determine whether any of the common data has been modified, and retrieving the modified common data as the one or more elements. Transmitting the data elements to one or more of the plurality of platforms may include identifying one or more of the platforms as requiring an update to the common data, formatting the data elements according to one or more publishing formats of the identified platforms, and sending the formatted data elements to the identified platforms. Formatting the data elements may include identifying, from one or more templates formatted according to one of the publishing formats, one or more of the templates as containing one or more of the elements of the data structure to which the received data elements are compared. Formatting the data elements may further include identifying, within the one or more identified templates, one or more regions containing common data, and formatting the data elements for inclusion in the identified regions. The method may further include analyzing each platform to determine which of the elements of the stored data structure map to each data field and customizable element provided by the platform, which may be performed using one or more scoring algorithms.

The stored data structure may be contained within a content database, and the method may further include updating the stored data structure with the data elements. Such updating may include one or both of: storing in the stored data structure any data element that does not match the element of the stored data structure to which the data element is compared; and storing in the stored data structure any data element that is not comparable to an element of the stored data structure. The stored data structure may be one or more web pages.

In another implementation, a method in accordance with this disclosure may include storing, in one or more data structures, one or more first data elements comprising common data for a plurality of platforms, each first data element having a data type. The method may further include receiving one or more second data elements comprising common data for the plurality of platforms, each second data element having a data type. The method may further include comparing second data elements to first data elements of the same data type. For each of the second data elements that do not match the first data elements to which the second data elements are compared, the method may include storing in the data structure the second data element in place of the first data element to which it is compared. The method may further include determining that one or more of the second data elements is a new common data element that does not correspond to any first data element, storing the new common data elements in one or more of the data structures, and storing one or more templates formatted according to one or more publishing formats of one or more of the platforms, each of the templates having one or more regions for displaying common data from the one or more data structures.

In another implementation, a method in accordance with this disclosure may include receiving, from a web server, one or more data elements comprising common data for a plurality of platforms, and storing each of the data elements according to a publishing format. The data elements may be formatted according to the publishing format upon receipt from the web server. The method may further include formatting the data elements for the publishing format. The method may further include providing to the web server one or more data fields to which the web server maps the one or more data elements. Receiving the one or more data elements from the web server may include receiving a template formatted according to the publishing format and comprising one or more regions containing common data. Storing each of the data elements may include storing the template.

In another implementation, a method in accordance with this disclosure may include entering, into an interface, one or more data elements comprising common data for a plurality of platforms, and causing the interface to transmit the data elements to one or more servers. The servers may be configured to compare the data elements to one or more elements of a stored data structure and, if the data elements do not match the elements of the stored data structure to which the data elements are compared, transmit the data elements to one or more of the plurality of platforms. The interface may be provided by one of the servers over the internet, or the interface may be provided on one of the platforms. Entering the data elements may include entering information in response to a series of prompts on the interface. The information may include the data elements and other data to be displayed on a website. The servers may be further configured to receive the information and generate one or more web pages using one or more templates. The method may further include selecting a desired template from a plurality of templates. The method may further include providing the one or more servers with access to each of the plurality of platforms.

In another implementation, a method in accordance with this disclosure may include receiving one or more data elements comprising common data for a plurality of platforms, and transmitting one or more of the data elements to one or more of the platforms. The method may further include receiving a first list of the platforms to which the data elements must be transmitted, and transmitting one or more of the data elements to one or more of the platforms may include transmitting one or more of the data elements to each platform on the first list. The method may further include receiving a second list of the data elements to be transmitted to each platform on the first list, and transmitting one or more of the data elements to one or more of the platforms may include transmitting the data elements to the platforms according to the second list. Furthermore or alternatively, transmitting one or more of the data elements to one or more of the platforms may include identifying which of the plurality of platforms should receive one or more of the data elements. The data elements may be received from an interface or from one of the platforms.

In another implementation, a system in accordance with this disclosure may include a server in electronic communication with a plurality of third-party platforms. The server may be configured to receive, from a user, content information for building a website for the user. The content information may include one or more common data elements for a plurality of third-party platforms. The server may be further configured to extract the common data elements from the content information. Then, for each third-party platform, the server may be configured to identify the common data elements that map to one or more display elements of the third-party platform, access the third-party platform, and transmit the identified common data elements to the third-party platform. The first server may receive the content information from the user by retrieving a template for a web page, the template comprising one or more regions formatted to display common data, and prompting the user to enter the information intended to be displayed in each of the regions. The server may be further configured to store the common data elements in a stored data structure, receive one or more updated common data elements for the plurality of third-party platforms, compare the updated common data elements to one or more of the common data elements in the stored data structure, and, for any of the updated common data elements that do not match the common data elements to which the updated common data elements are compared, store the updated common data element in the stored data structure in place of the common data element and transmit the updated common data element to one or more of the plurality of third-party platforms.

In another implementation, a system in accordance with this disclosure may include a first server in electronic communication with a plurality of platforms. The first server may have access to a stored data structure containing one or more common data elements, and may be configured to receive one or more input data elements comprising common data for the plurality of platforms, obtain a comparison of the input data elements to one or more of the common data elements in the stored data structure, and, for each input data element that does not match a common data element, transmit the input data element to one or more of the plurality of platforms. The system may obtain the comparison by querying a content database containing the stored data structure. The first server may contain the content database, or the system may include a second server that contains the content database and is remote from and in electronic communication with the first server, or the content database may be contained on one or more of the platforms. The first server may transmit the input data elements to the platforms by identifying one or more of the platforms as requiring an update to its common data, formatting the input data elements according to one or more publishing formats of the identified platforms, and sending the formatted data elements to the identified platforms. Formatting the input data elements may include: identifying, from one or more templates formatted according to one of the publishing formats, one or more of the templates as containing one or more of the common data elements of the data structure to which the input data elements are compared; identifying, within the one or more identified templates, one or more regions containing common data; and, formatting the input data elements for inclusion in the identified regions. The first server may be further configured to determine that one or more of the input data elements is a new common data element that does not correspond to any common data element of the stored data structure, and to transmit the new common data elements to one or more of the plurality of platforms.

The first server may be further configured to prompt the user to enter information for building a website, the information including the one or more input data elements. The first server may received the information from the user and extract the one or more input data elements from the information. The prompting for information may include retrieving a template for a web page, the template having one or more regions formatted to display common data, and prompting the user to enter the information intended to be displayed in each of the regions. The first server may be further configured to analyze each platform to determine which of the common data elements of the stored data structure map to each data field and customizable element provided by the platform, and may use one or more scoring algorithms to analyze each platform. The stored data structure may be one or more web pages.

The first server may be further configured to update the stored data structure by storing in the stored data structure any input data element that does not match the common data element of the stored data structure to which the input data element is compared, and storing in the stored data structure any input data element that is not comparable to a common data element of the stored data structure. The first server may be further configured to access one of the platforms, poll the platform to determine whether any of its common data has been modified, and retrieve the modified common data as the one or more input data elements. The system may further include an interface in electronic communication with the first server. The interface may be configured to allow a user to enter the one or more input data elements on the interface. The interface may be provided on the first server and accessible by the user over the Internet, or the interface may be provided on one or more of the platforms. The input data elements may be received from one of the plurality of platforms after the input data elements are entered onto the platform.

In another implementation, a system in accordance with the present disclosure may include a content database located on one or more computers. The content database may be configured to: store in one or more data structures one or more first data elements comprising common data for a plurality of platforms, each first data element having a data type; receive one or more second data elements comprising common data for the plurality of platforms, each second data element having a data type; and, for each of the second data elements that do not match the first data elements to which the second data elements are compared, store in the data structure the second data element in place of the first data element to which it is compared. The content database may be further configured to determine that one or more of the second data elements is a new common data element that does not correspond to any first data element, and to store the new common data elements in one or more of the data structures. The content database may be further configured to store one or more templates formatted according to one or more publishing formats of one or more of the platforms, each of the templates having one or more regions for displaying common data from the one or more data structures.

In another implementation, a system in accordance with the present disclosure may include one or more platforms, each platform being configured to present a subset of a user's information, and each platform's subset of the user's information comprising one or more common data elements. Each platform may have access, through electronic communication with a server, to a stored data structure containing the common data elements. Each platform may be configured to receive, from the server, one or more updated common data elements, and to replace one or more of the common data elements in the platform's subset of the user's information with the one or more updated common data elements. Each platform may be further configured to receive one or more input data elements comprising common data, and to transmit the one or more input data elements to the server.

The system may also include a data processing module for each platform, the data processing modules being in electronic communication with each other, having access to a stored data structure containing the common data elements, and being configured to: receive one or more input data elements comprising common data for the plurality of platforms; obtain a comparison of the input data elements to one or more of the common data elements in the stored data structure; and, for each input data element that does not match a common data element, transmit the input data element to one or more of the other data processing modules. The comparison may be obtained by querying a content database containing the stored data structure. The content database may reside on one or more of the platforms, or the system may further comprise a server containing the content database, the server being in electronic communication with each of the data processing modules.

In another implementation, a system in accordance with the present disclosure may include an interface for communicating with one or more platforms, each platform being configured to present a subset of a user's information, and each platform's subset of the user's information comprising one or more common data elements. The interface may be configured to receive one or more input data elements comprising common data, transmit the input data elements to one of the platforms if the input data elements are received from a server, and transmit the input data elements to the server if the input data elements are received from one of the platforms or from the user.

In another implementation, a system in accordance with the present disclosure may include one or more computers in electronic communication with a server, the one or more computers being configured to: receive, from a user, content information comprising one or more common data elements for a plurality of third-party platforms; extract the common data elements from the content information; and transmit the common data elements to the server. The server may be in electronic communication with a plurality of third-party platforms, and may be configured to identify the common data elements that map to one or more display elements of each third-party platform and transmit the identified common data elements to that third-party platform. The content information may be used to build a website for the user.

In any implementation, the plurality of platforms may include one or more of online platforms, offline electronic platforms, and non-electronic platforms. The online platforms may include at least one website hosting platform and at least one social networking platform. The non-electronic platforms may include a letterhead.

Referring to FIG. 1, a web server 100 may be configured to communicate electronically with one or more data stores in order to store, update, and retrieve information from the data stores. The electronic communication may be over the Internet using any suitable electronic communication medium, communication protocol, and computer software including, without limitation: a wired connection, WiFi or other wireless network, cellular network, or satellite network; TCP/IP or another open or encrypted protocol; browser software, application programming interfaces, middleware, or dedicated software programs. The electronic communication may be over another type of network, such as an intranet or virtual private network, or may be via direct wired communication interfaces or any other suitable interface for transmitting data electronically between a data store and the web server 100. In some embodiments, a data store may be a component of the web server 100, such as by being contained in a memory module or on a disk drive of the web server 100.

A data store may be any repository of information that is or can be made freely or securely accessible by the web server 100. Suitable data stores include, without limitation:

databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future; file systems; and electronic files such as web pages, spreadsheets, and documents. Each data store accessible by the web server 100 may contain information that is relevant to the maintenance of the user's common data, as described below.

In some embodiments, the common data may be stored as structured data in a content database 115. The common data may have any suitable format for storage, depending on the type of common data. That is, common data can be characters, integers or floating-point numbers, text strings, ordered or unordered lists, single-type or hybrid data structures, images, program code modules (i.e. compiled web application "widgets," scripting language functions), pointers to other data (i.e. a URL or file location), files, and other objects. The common data may be structured at any suitable level of abstraction. For example, in a relational database the common data may be organized into one or more tables, including nested tables, while in an object-oriented database the common data may be organized into hierarchical data structures that parse the data into its simplest elements (e.g. an "address" structure is parsed into street address, city, state, and postal code).

Figure 2:
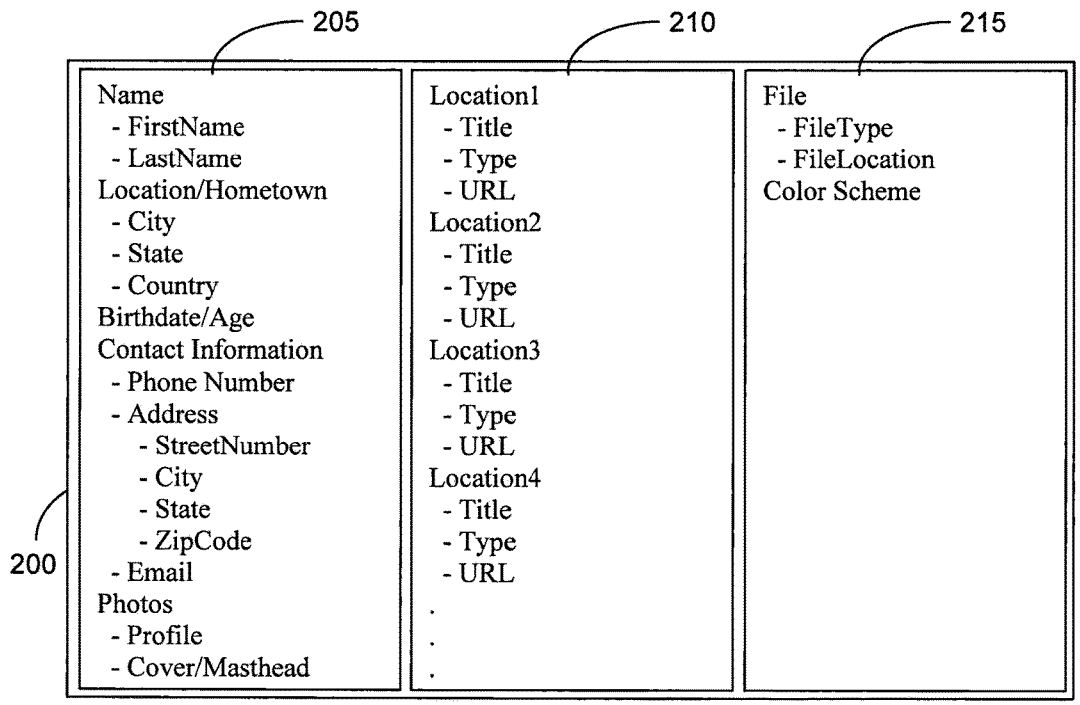
FIG. 2 is a diagram of an example common data set for an individual.

The common data may depend on the type of user. For example, as shown without limitation in FIG. 2, an individual's common data 200 may include a personal data set 205, an account data set 210, and a theme data set 215. The personal data set 205 may include data structures for name, location/hometown, birthdate (or simply age), contact information, and other data structures. The account data set 210 may include data structures for identifying online locations to which the user may want to direct visitors. Locations can include one or more social network profile pages, one or more personal websites, one or more favorite or relevant websites or web pages, and one or more content streams such as a blog, RSS or other feed, YOUTUBE channel, and the like. Data structures for the locations may include, for example, a location title, location type, and web address.

The theme data set 215 may include data structures representing elements of a theme to be maintained across platforms. A theme, as used herein, is a unifying design used when presenting information on each platform. The theme may include the graphics, layout, and other aspects of the presentation of the user's information, including common data. The data structures may include files, such as images, layout templates (e.g. HTML or MICROSOFT WORD templates), cascading style sheet (CSS) modules or other style sheets, and other program code files (i.e. PHP or Perl files). The data structures may further include color schemes, skins, and the like. Users can select a pre-built theme and may then have the option of modifying one or more attributes (e.g., color or design elements) of the pre-built theme. The attributes may be stored in a CSS file that can be utilized to control thematic elements across a number of platforms. The theme may also contain decorative elements (design elements), user preference relating to what display elements (e.g., information or widgets) are displayed on a particular website and how the display elements should be rendered, customizations of the overall color palette, font selection, image placement, and the like. This theme information can be stored in the content database 115 or another database.

In some cases, the user may specify a position of the elements within the theme or in a particular rendering. In some implementations, this positional information can be utilized to infer how the user wishes to use each piece of information or widget. This may enable, for example, mapping display elements to be pulled from a website and utilized within the user's twitter profile page.

Figure 3:
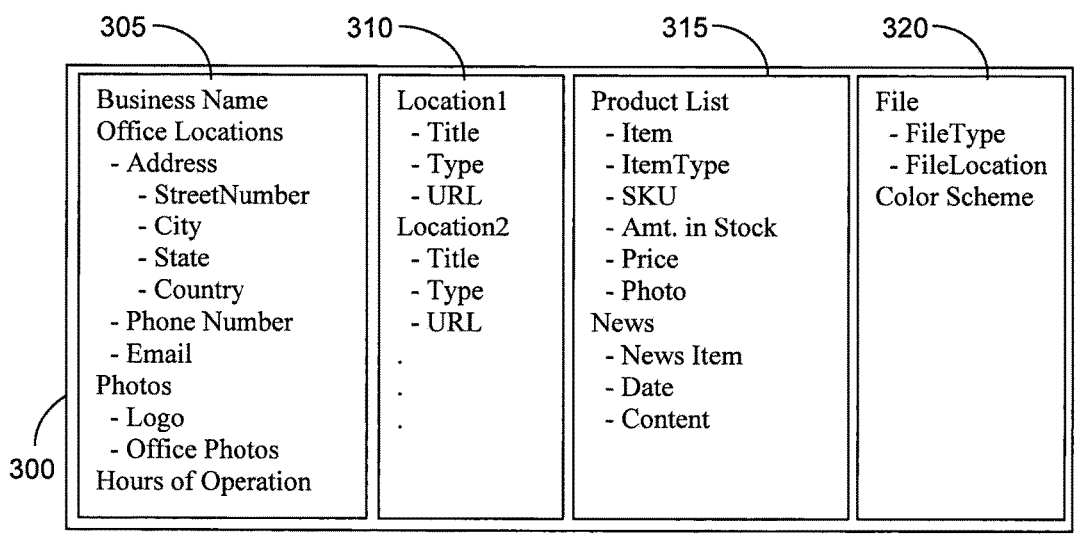
FIG. 3 is a diagram of an example common data set for a business.

FIG. 3 illustrates an example of common data 300 for a business. The business common data 300 may include a basic data set 305, an account data set 310, a content data set 315, and a theme data set 320. The basic data set 305 may include data structures for business name, office location and contact information, photos, and business hours of operation. The account data set 310 may include data structures for identifying online locations, as in the account data set 210 of FIG. 2 described above. The content data set 315 may include data structures for the business' products. A product list may be a menu, partial or full catalog, inventory, or similar list. The content data set 315 may include other data structures to relate information across multiple platforms, such as a news item data structure. The theme data set 320 may include data structures for the business' theme as in the theme data set 215 of FIG. 2 described above.

The web server 100 may maintain the common data using one or a combination of any suitable database querying and control schema, such as MySQL, Oracle, IBM DB2, or another relational database management system, JADE, DB4O, or another object-oriented database management system, or other schema and associated systems. Maintaining the common data may include executing queries or instructions upon the content database 115 in order to store new data elements, update or delete existing data elements, and retrieve data elements for distribution to one or more of the platforms.

Referring again to FIG. 1 and as described above, the user, which may be an individual or group of individuals, or a business or other organization represented by an employee, third party, or other agent, may access the web server 100 using an interface 105. The interface 105 may be located on the web server 100 and communicated to the user over the Internet or another computer network. Alternatively, the interface 105 may be located on a device accessible to the user, such as a desktop or laptop computer, tablet computer, smartphone, personal data assistant, server, mainframe, and the like. Alternatively, the interface 105 may be located on one or more of the platforms. The platforms may include one or more website hosting platforms 120 (e.g. GODADDY Web Hosting), one or more social networking/profile listing platforms 125 (e.g. FACEBOOK, TWITTER, GOOGLE Places for Business), one or more content feed platforms 130 (e.g. YOUTUBE, WORDPRESS), one or more digital offline or downloadable-content platforms 135 (e.g. AMAZON Simple Email Service, FTP server), one or more non-digital electronic platforms 140 (e.g. television, radio), and one or more non-electronic collateral creation platforms 145 (e.g. printed media layout and publishing software), with which the web server 100 may be in electronic communication in order to send or receive data. In general, the web server 100 may be configured to communicate electronically with any suitable platform in order to perform the common data maintenance in accordance with this disclosure. A platform may comprise one or more local data stores. The local data store may be directly accessible by the web server 100, or the respective platform may have an interface, such as an application programming interface (API) or another database frontend, through which the web server 100 may transmit and receive data.

In some embodiments, one or more of the local data stores may contain its own instance of the common data, which exists separately from the centrally-maintained instance of the common data within the content database 115. To maintain consistency of the common data in these embodiments, the web server 100 may retrieve current common data from the content database 115 according to the methods described herein, and transmit it to one or more of the platforms, or each platform may, periodically or upon an event, query the web server 100 for the most current common data. With its locally-stored common data updated, each platform may then format the common data according to its native formats. In other embodiments, a single instance of the common data may be maintained in the content database 115. The web server 100 may retrieve, format, and deliver the common data to one or more of the platforms as described further below. The local data stores do not retain a copy of the common data per se, but store the formatted data as delivered by the web server 100.

One or more of the platforms may have one or more predefined publication formats in which the common data and other content should be placed for publication on the associated platform. A platform format may be a file type or a combination of file types that the platform uses to publish data. A platform format may additionally or alternatively be a template, theme, layout, or other organizational scheme that coordinates data elements for display in the publication. In some embodiments, the platform format may include a data element identification scheme, such as a metadata tag scheme, that the web server 100 can access to determine which common data elements should be included in the format. The platform format may further inform the web server 100 how to size and stylize the common data elements and where to place them. FIGS. 4-7 illustrate non-limiting examples of platform formats for certain platforms.

Figure 4:
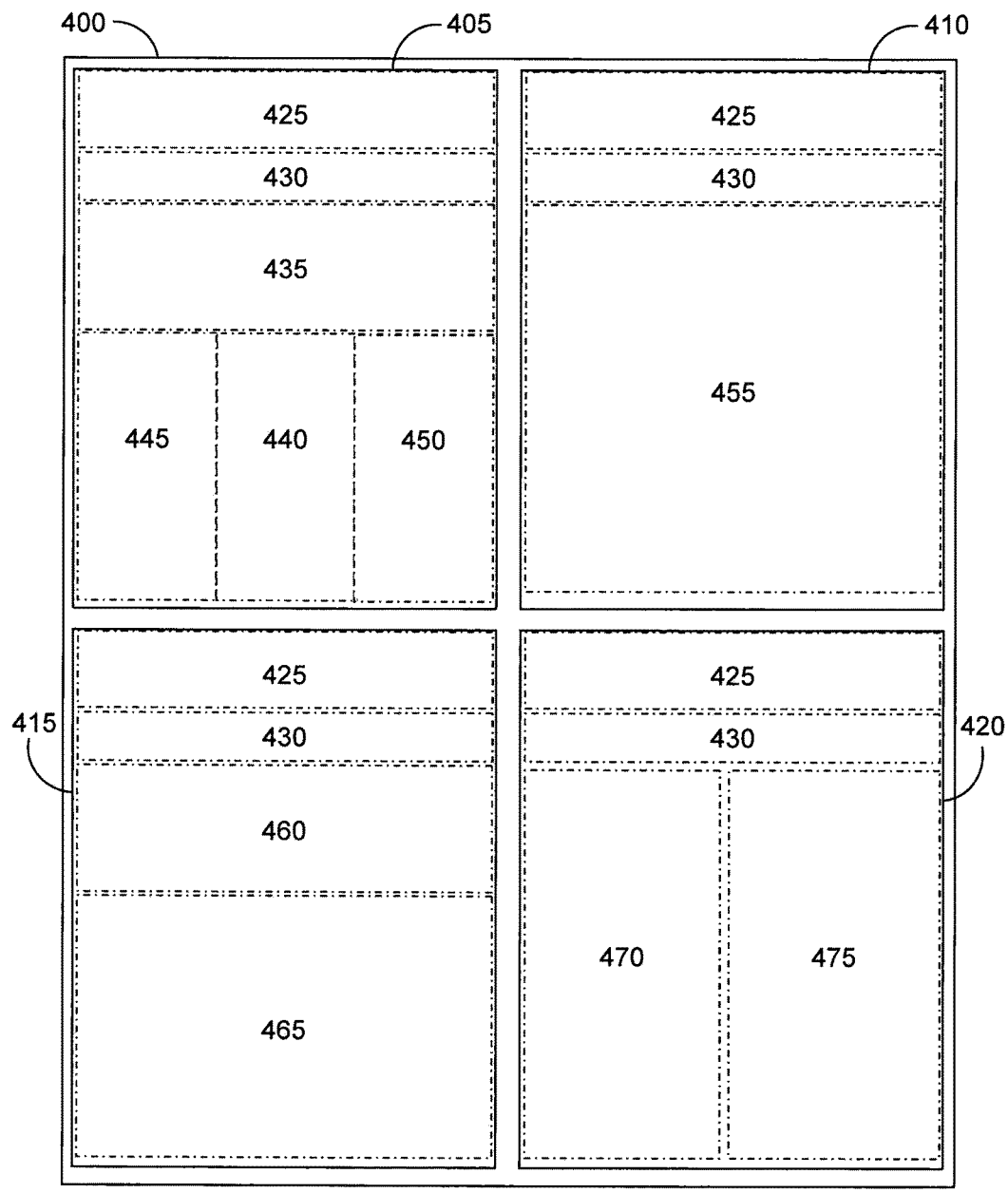
FIG. 4 is a diagram of a template for a website platform according to the present disclosure.

FIG. 4 illustrates an example template 400 for a user's website, wherein the user is a restaurant. The template 400 includes page layouts 405-420 for a plurality of web pages: a "home" page layout 405 for displaying basic information; a "menu" page layout 410 for displaying the menu; an "about" page layout 415 for displaying restaurant background, such as history of the restaurant or biographies of the owners or chef; and a "contact" page layout 420 for displaying addresses, phone numbers, driving directions, email feedback forms, and the like. Each page layout 405-420 includes one or more content regions 425-475 for receiving and displaying content, which may include common data. Each content region 425-475 may be tagged with a content identifier. For each content region 425-475 that contains common data, the web server 100 is configured to recognize that content region's content identifier and associate it with the corresponding common data as the common data is structured in the content database 115. The web server 100 may thereby ascertain whether common data needs to be extracted from or updated on the user's website, according to the methods described below.

In the illustrated example template 400, each page layout 405-420 includes a masthead region 425 and a navigation region 430. The masthead region 425 may display the entity's name, logo, other graphics, or a combination thereof. The web server 100 may determine that the masthead region 425 contains common data elements from at least the basic data set 305 (i.e. entity name and logo), and potentially also the theme data set 320 (i.e. other graphics or colors). The navigation region 430 may display internal links to other web pages in the website and may contain colors or other common data from the theme data set 320. The home page layout 405 further contains a main graphic region 435, an attraction region 440, a location region 445, and a news region 450. The main graphic region 435 displays a relevant and eye-catching graphic, such as a photo of the storefront or of a dish served at the restaurant. The attraction region 440 displays relevant and eye-catching text information, such as the restaurant's specials or other data that may be common data located in the content data set 315 or another data set. The location region 445 displays important contact information, such as a map locating the restaurant and the restaurant's address and phone number. The web server 100 may determine that the displayed information is common data from the basic data set 305. The news region 750 displays recent information published about the restaurant, which may be common data stored in the content data set 315.

The menu page layout 410 may further include a menu region 455 for displaying the restaurant's menu, which may be in the content data set 315. The about page layout 415 may further include a bio image region 460 and a biography region 465. The bio image region 460 displays a relevant graphic, such as a photo of the storefront or restaurant owners, which may be common data in the basic data set 305. The biography region 465 displays a narrative regarding the restaurant and its owners. While not illustrated in FIG. 3, the narrative may be common data stored in one of the illustrated data sets, such as the content data set 315, or another data set. The contact page layout 420 may further include an info region 470 and a feedback region 475. The info region 470 displays contact information, such as phone number, address, map, and the like. The web server 100 may determine that the displayed information is common data from the basic data set 305. The feedback region 475 displays a form for website visitors to fill out and submit to the restaurant. The form structure may be stored in the template.

Figure 5:
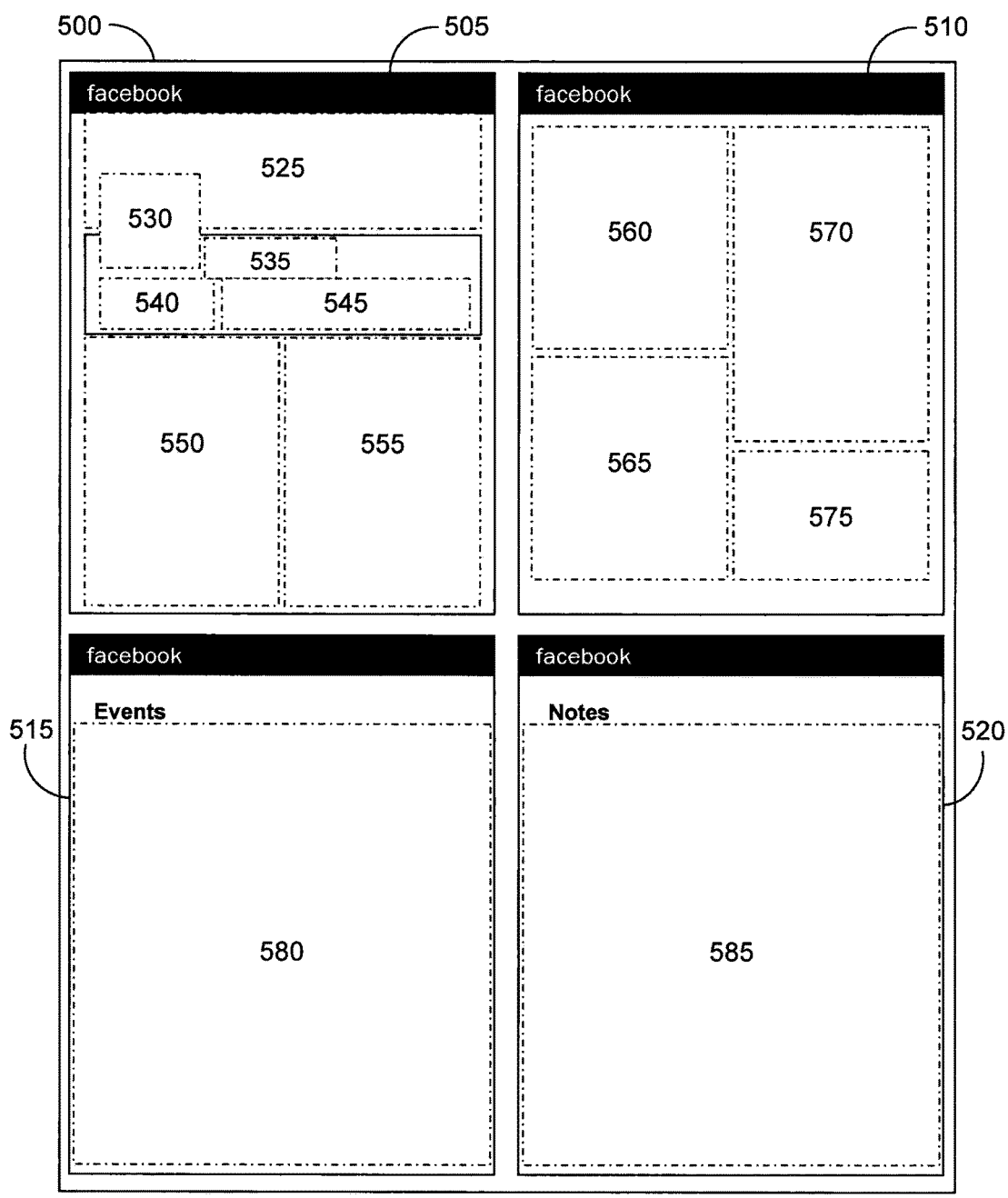
FIG. 5 is a diagram of a template for a social networking platform according to the present disclosure.

FIG. 5 illustrates a templated FACEBOOK layout 500 for the restaurant that has the website of FIG. 4. The FACEBOOK layout 500 includes page layouts 505-420 for a plurality of web pages: a "home" page layout 505 for displaying the restaurant's profile information; an "about" page layout 510 for displaying maps, addresses, phone numbers, other contact information, and biographical information; an "events" page layout 515 for displaying events at the restaurant; and a "notes" page layout 520 for displaying commentary by the restaurant. Each page layout 505-520 includes one or more content regions 525-585 for receiving and displaying content, which may include common data. Each content region 525-585 may be tagged with a content identifier. For each content region 525-585 that contains common data, the web server 100 is configured to recognize that content region's content identifier and associate it with the corresponding common data as the common data is structured in the content database 115. In some embodiments, the content identifier for a region 525-585 may match a corresponding region 425-475 of the website 400 that contains the same common data as the region 525-585 on the FACEBOOK layout 500. In other embodiments, the FACEBOOK layout 500 may have different region identifiers from the website 400 that the web server 100 is nevertheless configured to recognize. The web server 100 may thereby ascertain whether common data needs to be extracted from or updated on the user's FACEBOOK profile, according to the methods described below.

In the illustrated example home page layout 505, a cover photo region 525 displays a photo which may be common data from one of the data sets in the content database 115. A profile photo region 530 displays another common photo, such as the restaurant's logo, which may be in the basic data set 305. An entity name region 535 displays the restaurant's name, which is common data in the basic data set 305. A basic information region 540 displays the restaurant's address, phone number, hours of operation, type of cuisine, and other common data from the basic data set 305. A navigation region 545 displays internal links to other pages of the user's FACEBOOK profile. News regions 550, 555 display recent information published about the restaurant, some of which may be common data stored in the content data set 315.

The about page layout 510 may include a map region 560 for displaying a mapped location of the restaurant, which may be derived from address information in the basic data set 305. A biography region 565 displays a narrative regarding the restaurant and its owners. While not illustrated in FIG. 3, the narrative may be common data stored in one of the illustrated data sets, such as the content data set 315, or another data set. A restaurant info region 570 displays contact information, such as phone number, address, hours of operation, and the like, which may include common data from the basic data set 305. A platforms region 575 displays links to other online platforms where the restaurant has a presence. The information for the links may include common data from the account data set 310.

The events page layout 515 may include an event list region 580 for listing information about events at the restaurant. For example, an event can include a title, photo, date, time, and cost, which may be common data elements stored in an event data structure in the content data set 315. Similarly, the notes page layout 520 may include a list of notes, news items, articles, or other content, each item being stored in a data structure as common data in the content data set 315.

Figure 6:
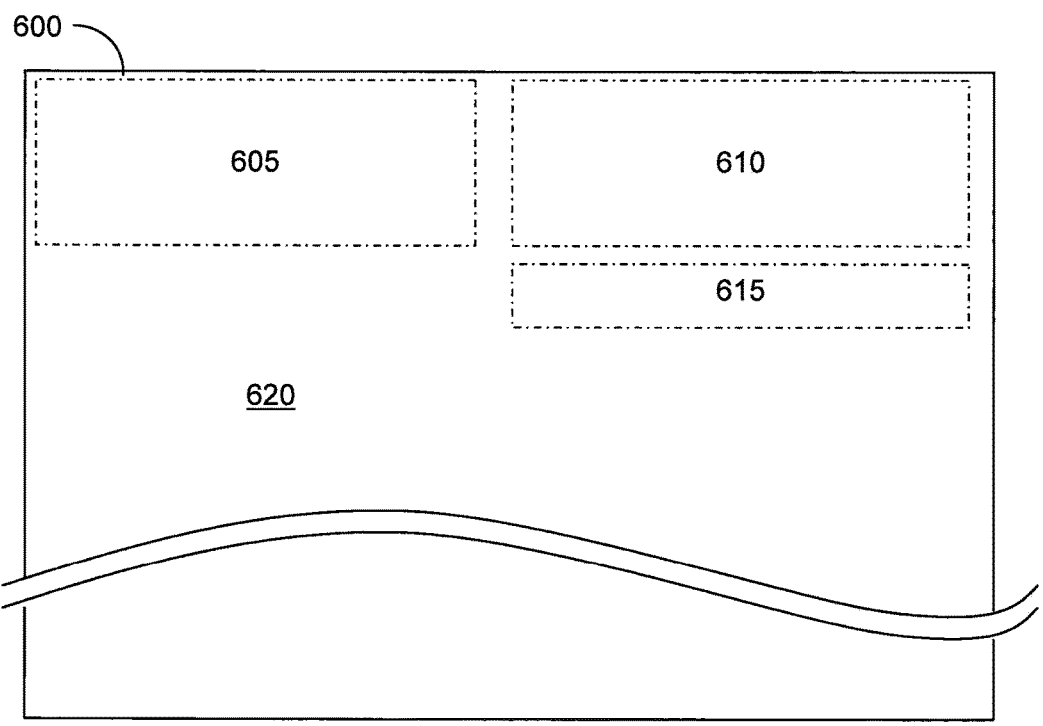
FIG. 6 is a diagram of a template for a first non-electronic platform according to the present disclosure.
Figure 7:
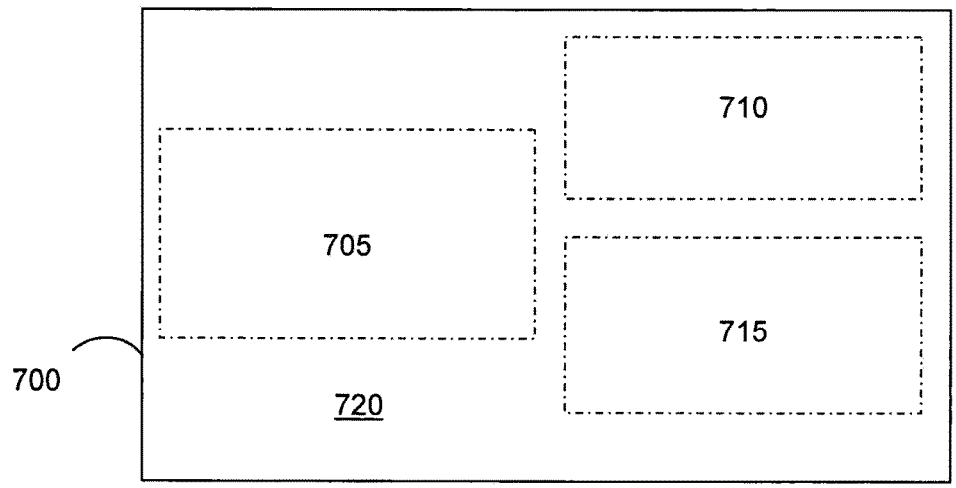
FIG. 7 is a diagram of a template for a second non-electronic platform according to the present disclosure.

FIG. 6 illustrates an example template for a letterhead 600, and FIG. 7 illustrates an example template for a business card 700, for the business that has the website of FIG. 4. The templates may be used in a software program for generating layouts of the letterhead 600 and business card 700, before the letterhead and business cards are printed, and the templates may include identifiable regions, as described with respect to FIGS. 4 and 5 above, that the web server 100 may use to identify common data to be inserted into the regions. In each example template 600, 700, a logo region 605, 705 displays the business logo, which may be common data in the basic data set 305. An address region 610, 710 displays the contact information contained in the basic data set 305. An employee region 615, 715 includes data identifying the employee, which may be common data or other data that is extracted from a different data store. A background region 620, 720 may include graphics, colors, or other elements of a platform-spanning theme, which may be common data in the theme data set 320.

Figure 8:
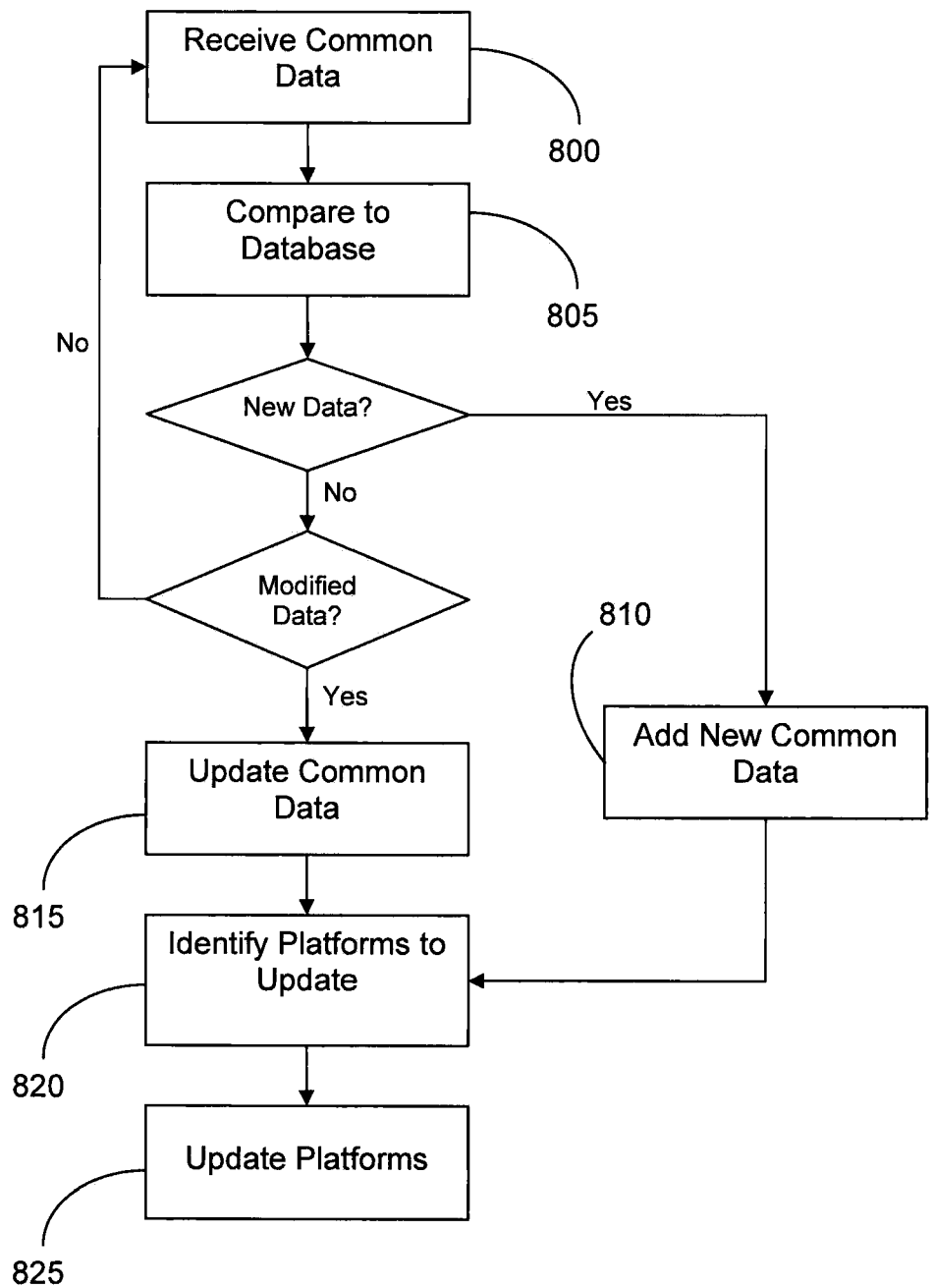
FIG. 8 is a flow diagram of a method for maintaining common data across multiple platforms according to the present disclosure.

FIG. 8 illustrates an embodiment of a method the web server 100 may use to maintain the common data across multiple platforms. At step 800, the web server 800 may receive common data. The common data may be received from the user through an interface 105 as described above. The interface 105 may allow the user to identify the types of common data being entered, such as by providing one or more fillable forms or by allowing the user to generate its own data tags. Alternatively or additionally, the interface 105 or the web server 100 may be configured to analyze the entered common data to determine the data types and parse the data into data structures for storage in the content database 115. The web server may additionally or alternatively receive the common data at step 800 from one or more of the platforms with which the web server 100 is in communication. In some embodiments, the system of FIG. 1 may be configured so that when a user updates common data on one of the platforms, that platform transmits the changed or added common data to the web server 100. For example, when the user changes its profile photo on its FACEBOOK profile, the new photo may be transmitted to the web server 100 or retrieved by the web server 100. In that case, the user may provide the web server 100 with access credentials to access one or more platforms (such as FACEBOOK) using a suitable user account management system. Having been provided with credentials, the web server 100 can poll the platform through a suitable API, such as a FACEBOOK API, to determine whether information, such as text, photos, or videos, have been modified. If so, the web server 100 can retrieve the modified information to incorporate that information into the common data.

In other embodiments, the web server 100 or a separate interface (not shown) may be configured to periodically retrieve the common data from each platform, so that it is received on the web server 100.

At step 805, the web server 100 may compare the received common data to the common data stored in the content database 115. If necessary, the web server 100 may first identify the common data that was received. In some embodiments, the web server 100 may identify the common data using the data element identification scheme of each platform. Comparing the common data may include querying the content database 115 for the same data elements that were received at step 800 and determining if the data elements in the content database 115 match those received. If there are no data elements in the content database 115 that correspond to the received data elements, the received data elements comprise new common data that, at step 810, the web server 100 may add to the content database 115. Otherwise, if the data elements match, no update is needed, and if the data elements do not match, the web server 100 updates the common data in the content database 115 at step 815.

At step 820, the web server 100 identifies which platforms should be updated with the received common data. To enable accurate and precise updating of the platforms, each platform is analyzed to determine a purpose or function of each customizable element or data field provided by the platform. The common data is then analyzed to determine which types of common data map to the customizable elements or data fields offered by each platform. The suitability of particular data elements in the common data to map to particular elements or data fields of a platform can be scored using any appropriate scoring algorithm. One approach may include scoring the intent of each image on the user's common data in order to rank likelihood of that data to map to the receiving platform's configurable data field. For example, one component of Twitter profile banner photo scoring is knowing a large dominant image "hero image" on the home page of a website near the top middle is likely to map. Alternatively, the dimensions of images contained in the common data may be utilized to determine the suitability of a particular image for an image field of a particular platform. If the dimensions match or are sufficiently close to one another (e.g., their dimensions fall within a threshold range) the image in common data may be determined to be suitable for use in the platform's image When updating a platform with new common data, the update may involve retransmitting all suitable common data (or a subset thereof) in new data transmissions or, alternatively, only transmitting or updating a delta from the old values stored with the platform.

In some embodiments, the content database 115 or another data store accessible by the web server 100 may include a structured list of platforms to which the common data should be delivered when it is updated. The structured list may also include, for each platform, access information such as a login/password combination that the web server 100 may use to deliver common data. As not all platforms may require every element of common data, the structured list may further include, for each platform, a sub-list of the common data elements that should be transmitted to the platform when such elements are changed. The sub-list of common data elements may include formats particular to each platform for one or more of the data elements. For example, a first format for a common profile photo may have a first size of 200×200 pixels for FACEBOOK and a second format may have a second size of 130×130 pixels for TWITTER. The structured list may additionally or alternatively include metadata tags or other identifiers that associate a particular data element with its appropriate element in a predefined publishing format.

At step 825, the web server 100 may update the platforms identified as needing an update of the common data. In some embodiments, the web server 100 may transmit the new or changed common data to the platforms in a raw or partially formatted state. Examples of such transmission include a raw data stream, raw or rich text file, or a data structure in a readable format such as XML, JSON, MICROSOFT EXCEL spreadsheet or MICROSOFT ACCESS database entries. Each platform may then extract the common data from the transmission and format the common data according to its own purposes. Alternatively, the new or changed common data may be transmitted to a platform using an API provided by the platform. In that case, the new or changed common data may be formatted in accordance with requirements established by that API. In some cases, the platform's API will be a publicly available API for which documentation is readily available. In other cases, the API will not be public and instead may be provided pursuant to an agreement between the platform owner and the operator of the web server 100.

Figure 9:
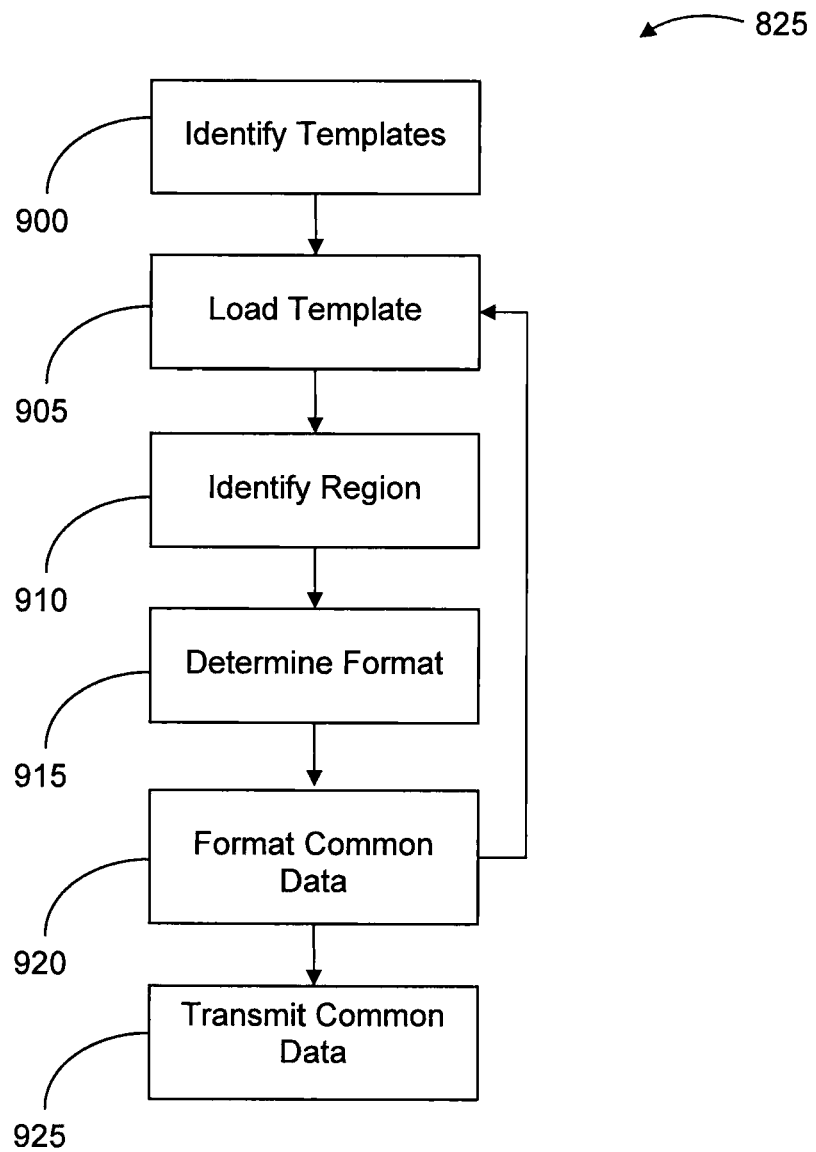
FIG. 9 is a flow diagram of a method for formatting common data to be distributed to a platform according to the present disclosure.

Additionally or alternatively, the web server 100 may format the common data according to one or more of the publishing formats used by each of the platforms. The web server 100 may retain or store in the content database 115 or another data store, one or more templates, such as those illustrated in FIG. 4-7, for each platform's publishing formats. Referring to FIG. 9, some embodiments of the step of updating the platforms may include, at step 900, identifying the templates of each platform that contain regions that should be updated with the common data.

For example, when publishing data to a third party platform, such as TWITTER or FACEBOOK, a number of techniques may be utilized to identify data stored within the common data that map to one or more display elements of the third party platform. For example, if a third party platform has a background image display element, a suitable image can be identified in the common data. One approach for identifying a suitable background image in the common data can include identifying an image that has been used as a background image in the user's website (or alternatively the background color of the user's website).

If a third party platform calls for a header image or cover photo, the common data can be analyzed using a scoring criteria to identify images that can be used as header images or cover photos. Example criteria that may be used to score an image include whether the image is used on the user's home page, whether the image is a "hero image" (i.e., the largest image on a web page, located at the top-middle of a web page, first image in a slideshow, etc.), whether the shape of the image matches the dimensions called for by the third party platform, and the like.

If a third party platform calls for a profile picture, the common data can be analyzed using a scoring criteria to identify images that can be used as profile images. Example criteria that may be used to score an image include whether an image in the common data has been placed into the user's website using absolute positioning, with more points being given to images located in the top-left of a web page and, if no pictures are on the left of the web page, more points are awarded to images on the right side of the web page, additional points may be given to images that are closer to the dimensions of a profile image (e.g., images that have square dimensions), the file name of the uploaded image (e.g., more points will be awarded to images that have file names of logo.gif), and the like.

In the specific case of the third party platform being TWITTER, the common data can be analyzed to determine a suitable list of handles that the user may wish to follow (and in some cases, the user's TWITTER account may be accessed to cause the account to follow the identified list of handles). For example, the common data may be utilized to identify an industry category for the user or the user's business. Then, based upon that industry determination, TWITTER's auto-follow API may be utilized to determine a list of handles to follow.

In some cases, the scoring criteria described above can be updated, refined, and otherwise modified based upon how often users modify images that are automatically selected from the common data.

At step 905, for each template, the web server 100 loads the template and then, at step 910, the web server 100 identifies the regions containing common data that should be changed. At step 915, the web server 100 determines, from HTML tags, metatags, or other formatting tags, how to format the common data for inclusion in the region. At step 920, the web server 100 formats the common data according to the determined format. The web server 100 may repeat steps 905-920 for each identified template. At step 925, the web server 100 transmits the formatted common data to the platform, by transmitting the template, the region, or the formatted data itself.

In accordance with the described system and methods, the web server 100 may create, from structured data stored in a content database 115, one or more web pages of a website. Furthermore, the web server 100 may receive some or all of the common data elements from the user during the website creation process, and may store or update the common data elements in one or more data structures. In one embodiment, the web server 100 may provide, through the interface 105, a series of prompts for receiving information that the user may want to display on the web pages. The prompts may be used to derive the proper templates to be used for creating the website. For example, the web server 100 may prompt the user to enter the type of business (i.e. restaurant, mechanic, massage parlor, etc.) that the website will promote. The user's input allows the web server 100 to select a template that has regions for containing the relevant content, or to select a subset of templates and provide the templates to the user for selection. The information provided by the user may include content information to be incorporated into the regions of the web page templates. The web server 100 may store the common data in data structures. The data structures may be stored in a database as described above, or alternatively the data structures may be stored as web pages in any suitable markup language. In the latter case, common data elements may be identified through Microdata or other tagging, so that the web server 100 may perform the common data maintenance methods described above by extracting elements from and storing elements within the web pages, rather than a central database.

Furthermore, the web server 100 may create different versions of the website in order to serve requested website content to requesting devices 110 of varying capabilities. A requesting device 110 may be a device for which web pages are typically designed without concern for display, user interface, processing, or Internet bandwidth limitations, including without limitation personal and workplace computing systems such as desktops, laptops, and thin clients, each with a monitor or built-in large display (collectively "PCs"). A requesting device 110 may be a device that cannot display the informational and functional content of web pages that are designed for viewing on PCs. Such limited devices include mobile devices such as mobile phones and tablet computers, and may further include other similarly limited devices for which conventional websites are not ordinarily designed. Mobile devices, and mobile phones in particular, have a significantly smaller display size than PCs, and may further have significantly less processing power and, if receiving data over a cellular network, significantly less Internet bandwidth. The web server 100 may use the same data from the content database 115 used to create the website to also create publications across other platforms as described above.

Figure 10:
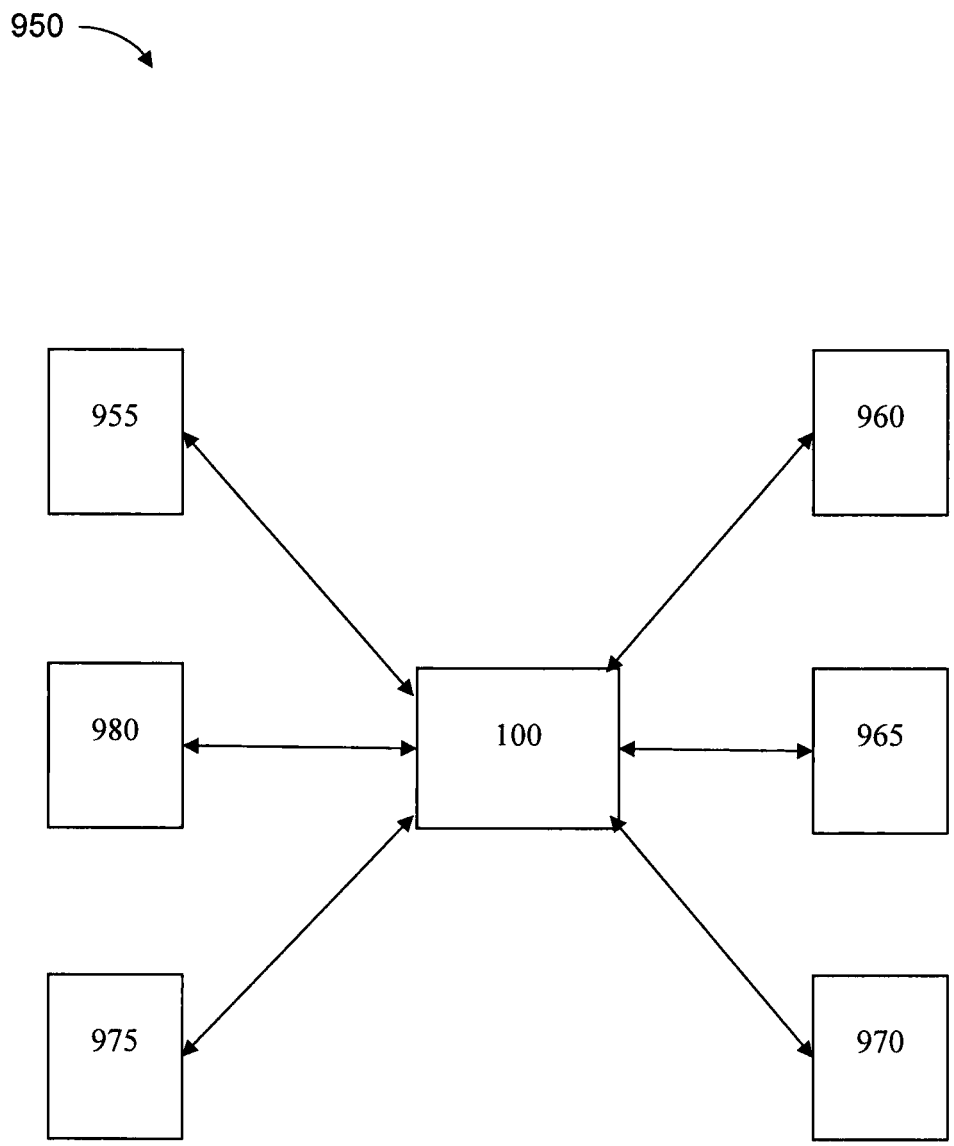
FIG. 10 is a block diagram showing the functional components of a system for maintaining common data across multiple platforms according to the present disclosure.

Referring to FIG. 10, a system 950 for performing the common data maintenance methods described above may include the web server 100 and a plurality of modules for performing one or more steps of the methods. The modules may be hardware or software-based processing modules located within the web server 100, in close physical vicinity to the web server 100, or remove from the web server 100 and implemented as standalone computer servers or as components of one or more additional servers. The modules may include, without limitation: a user interface module 955 for providing input/output capabilities between the system 800 and the user; a data retrieval module 960 for performing queries and modifications of the content database 115 and other data stores; a data processing module 965 for evaluating and comparing received and retrieved data; a formatting module 970, which may be a component of the data processing module 965 or a separate module, and which populates an identified template as described above and stores the template; one or more data storage modules 975 for storing templates, common data structuring paradigms, and related data; and a communication module 980 for communicating with the various platforms.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

We claim:

1. A method, comprising:
   receiving, from a user, by a server computer coupled to a network and comprising at least one processor executing software instructions within a memory, a content displayed within a first at least one customizable display element within a first electronic display template configured in a first display format for a first electronic display platform;
   accessing, by the server computer, a second electronic display template configured in a second display format for a second electronic display platform that is not the first electronic display platform
   identifying, by the server computer, within the second electronic display template, at least one common data element comprising a second at least one customizable data element within the second electronic display template;
   transmitting, by the server computer, the content, for display, within the at least one identified common data elements;
   storing, by the server computer, the at least one common data element in a stored data structure;
   receiving, by the server computer, the content for at least one updated common data element;
   comparing, by the server computer, the content for the at least one updated common data element to the content for the at least one common data element in the stored data structure; and
   responsive to a determination that the content for the at least one updated common data element does not match the content for the at least one common data element to which the content for the at least one updated common data element is compared;
   storing, by the server computer, the content for the at least one updated common data element in the stored data structure in place of the content for the at least one common data element; and
   transmitting, by the server computer, the updated content for the at least one common data element to the first electronic display platform or the second electronic display platform.

2. A method, comprising:
   receiving by a server computer coupled to a network and comprising at least one processor executing software instructions within a memory, a content displayed within a first at least one customizable display element within a first electronic display template configured in a first display format for a first electronic display platform;

identifying, by the server computer, within a second electronic display template configured in a second display format for a second electronic display platform that is not the first electronic display platform, at least one common data element comprising a second at least one customizable data element within the second electronic display template;

storing, by the server computer, the at least one common data element in a stored data structure;

comparing, by the server computer, the content for at least one updated common data element to the content for the at least one common data element in the stored data structure; and responsive to a determination that the content for the at least one updated common data element does not match the content for the at least one common data element of the stored data structure to which the content for the at least one updated common data element is compared, transmitting, by the server computer, the content for the at least one common data element to the first electronic display platform or the second electronic display platform.

3. The method of claim 2, wherein the first electronic display template or the second electronic display template comprise an interface to the user, allowing the user to enter the content on the interface.

4. The method of claim 3, wherein the interface is provided on a web server and is accessible by the user over the internet.

5. The method of claim 3, wherein receiving the content comprises:

prompting the user to enter, into the interface, information for building a website;

receiving the information from the user; and extracting the content from the information.

6. The method of claim 5, further comprising:

creating one or more web pages containing the information entered by the user; and storing the one or more web pages as the stored data structure.

7. The method of claim 5, wherein prompting the user to enter information for building the website comprises:

retrieving a template for a web page, the template comprising one or more regions formatted to display common data; and prompting the user to enter the information intended to be displayed in each of the regions.

8. The method of claim 3, wherein the interface is provided as the first electronic display platform or the second electronic display platform.

9. The method of claim 2, wherein receiving the content comprises receiving the content from the first electronic display platform or the second electronic display platform.

10. The method of claim 2, wherein the first electronic display platform or the second electronic display platform includes one or more online platforms.

11. The method of claim 10, wherein the first electronic display platform or the second electronic display platform further includes one or more non-electronic platforms.

12. The method of claim 2, wherein transmitting the updated content for the at least one common data element comprises:

identifying the first electronic display platform or the second electronic display platform as requiring an update to the at least one common data element;

formatting the content according to one or more publishing formats of the identified platforms; and sending the formatted content to the identified platforms.

13. The method of claim 12, wherein formatting the content comprises:

from one or more templates formatted according to one of the first display format or the second display format, identifying, by the server computer, at least one of the first electronic display template or the second electronic display template as containing the at least one common data element of the data structure to which the at least one updated common data element is compared;

identifying, by the server computer, within the first electronic display template or the second electronic display template, at least one region containing common data; and formatting, by the server computer, the at least one updated common data element for inclusion in the identified at least one region.

14. The method of claim 2, further comprising analyzing the first electronic display platform and the second electronic display platform to determine which of the elements of the stored data structure map to each data field and customizable element provided by the first electronic display platform or the second electronic display platform.

15. The method of claim 2 wherein receiving the content comprises:

accessing one of the first electronic display platform or the second electronic display platform;

polling the first electronic display platform or the second electronic display platform to determine whether the content has been modified; and retrieving the content.

* * * * *